April 17, 1951 F. B. FITCH 2,549,185
BEAN HARVESTER
Filed March 12, 1945 3 Sheets-Sheet 1
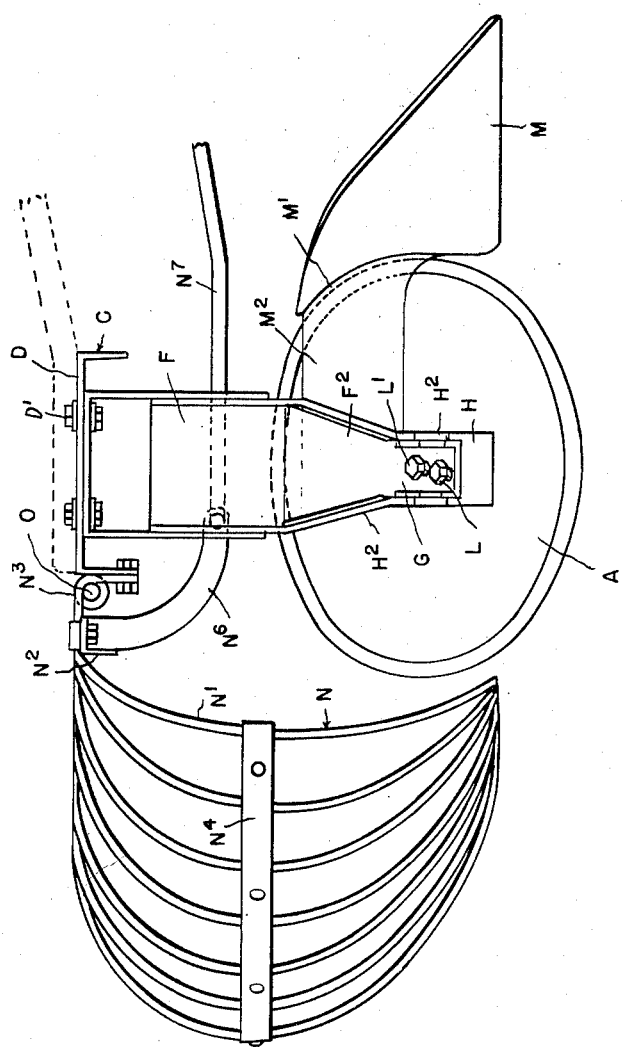
FIG.I.
INVENTOR.
FREDERICK B. FITCH
BY
Whittemore Hulbert+Belknap
ATTORNEYS April 17, 1951 F. B. FITCH 2,549,185
BEAN HARVESTER
Filed March 12, 1945 3 Sheets-Sheet 2
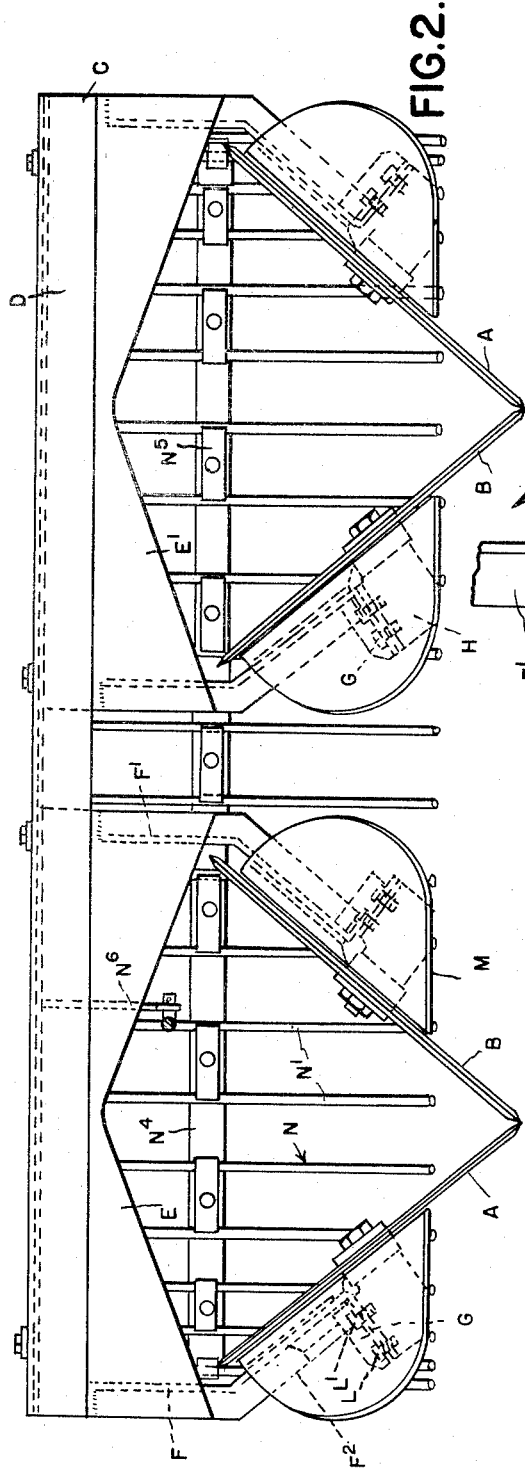
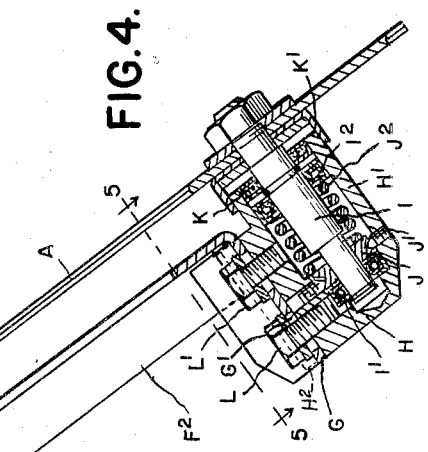
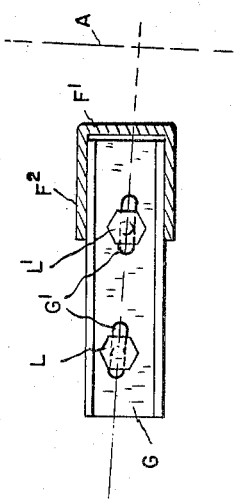
INVENTOR.
FREDERICK B. FITCH
BY
Whittemore Hulbert & Belknap
ATTORNEYS

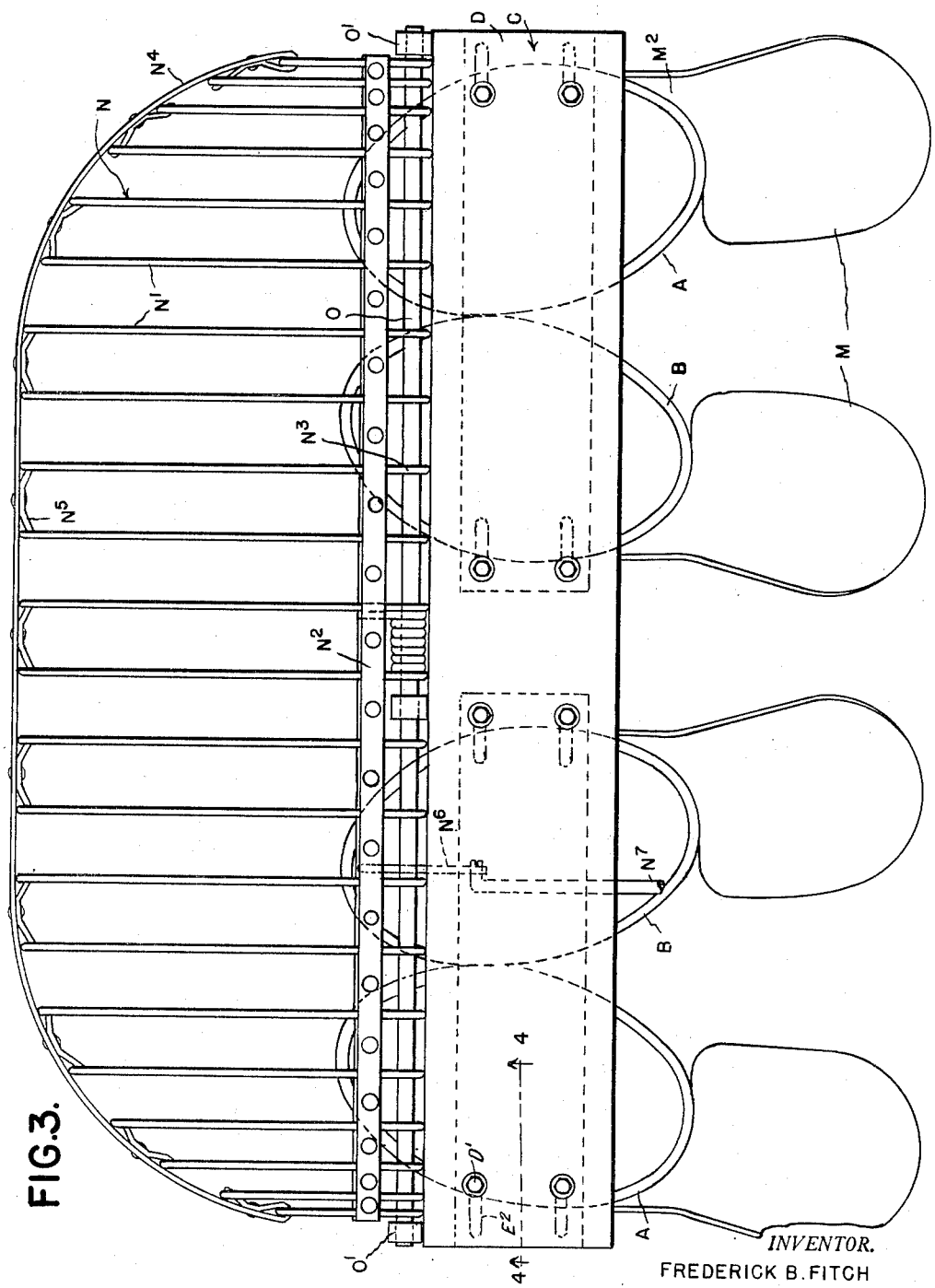

Patented Apr. 17, 1951

2,549,185

UNITED STATES PATENT OFFICE 2,549,185

BEAN HARVESTER

Frederick B. Fitch, Detroit, Mich.

Application March 12, 1945, Serial No. 582,389

1 Claim. (Cl. 55—107)

The invention relates to harvesting machines and more particularly to that type designed for use in the harvesting of beans and similar plants.

It is one of the objects of the invention to obtain a construction by which the plants or vines may be severed from their roots without any disturbance thereof, which might result in loss of a portion of the crop.

It is a further object to gather the vines in advance of the severing operation and to temporarily retain them for accumulation to form a pile.

It is a further object to obtain a construction in which a plurality of rows of vines may be harvested at the same time. With these and other objects in view the invention consists in the construction as hereinafter set forth.

In the drawings:

Fig. 1 is a side elevation of the harvesting machine;

Fig. 2 is a front elevation thereof;

Fig. 3 is a plan view;

Fig. 4 is an enlarged cross section on line 4—4, Fig. 3;

Fig. 5 is a section on line 5—5, Fig. 4.

In the harvesting of beans and other crops of like nature, great loss may occur by any shaking or disturbance of the vines which will shake off the pods or the beans therefrom. On the other hand, it is difficult to sever the vines from their roots without such disturbance. I have, however, devised a construction of harvester in which the vines are severed from the roots at a point below the surface of the earth so as to avoid disturbance of the portions above the surface.

Another feature of my construction is the means for gathering the vines which are adjacent to the surface of the earth and for retaining them together with any portion of the crop shaken therefrom during and subsequent to the severing operation.

A further feature is the means for periodically depositing the cumulative severed vines in a pile while still continuing the harvesting of the crop in advance thereof, the specific construction being as follows.

Vine severing means

The severing of the vines from their roots is accomplished by a pair of rotary discs A, B having peripheral cutting edges, said discs being arranged in opposite oblique planes to bring their lower portions in tangent relation. These discs are mounted on a frame C which is drawn or otherwise propelled by a suitable tractor (not shown). As shown in Figs. 2 and 3, a plurality of pairs of discs are mounted on the same frame and are adjustable thereon to correspond to the spacing between rows of plants. The frame C as specifically shown comprises an inverted channel beam D embracing channel-shaped sub-frames E and E'. Each of the latter has welded or otherwise secured thereto a pair of depending arms F, F' with obliquely inwardly extending portions $F^2$ which are respectively parallel to the planes of the discs A and B. A lateral arm G is secured to the lower end of each of the arms F and F' to extend at substantially right angles thereto and to form a support for the pivot bearing of the disc. This pivot bearing H has a hollow hub portion H' for receiving a shaft I journaled in a pair of radial and opposite end thrust ball bearings $I'$, $I^2$. Between these ball bearings is a sleeve or collar J which is secured in fixed position within the hub by screws J'. Between the collar J and the bearing $I^2$ is a coil spring $J^2$ which resiliently presses said bearing and the shaft I in a direction towards the disc and forms a yieldable support for the latter. Suitable packing material K and a cap member K' secured to the disc excludes the entrance of dirt into the hollow hub. The hub H has also a channel portion $H^2$ which embraces the lateral arm G and is adjustably secured thereto by clamping bolts L and L'. These bolts pass through slots G' in the arm G which permit of adjusting the hub so as to bring the disc carried thereby into proper relation to the opposite disc of the pair. Preferably the planes of the discs A and B are in slightly oblique relation to each other horizontally as well as vertically so as to outwardly flare in a forward direction. This will bring the point of tangency of the discs slightly in rear of the center thereof, as shown in Fig. 3. Such a placing of the discs is accomplished by making the channel of the portion $H^2$ to extend at a desired slight angle to the axis of the shaft I such, for instance, as one and one-half degrees.

Frame construction

The sub-frames E and E' are adjustably secured to the channel beam D by means of clamping bolts D' passing through slots $E^2$ in said frames. This permits of adjusting the frames E, E' in relation to each other so that the spacing between the several pairs of discs A, B corresponds to the spacing between rows of plants to be harvested. The whole frame C is supported by means of its connection with the tractor (not shown) so that the tangent contact between discs is a predetermined distance below the surface of the ground in the row. This, however, is above the roots so that in the forward advancement of the discs the vines will be severed therefrom.

Vine gathering means

The discs A and B form a V-shaped space therebetween for receiving the vines but this may not be equal in width to the spread of said vines. I have, therefore, provided in advance of each disc a gathering means for the vines having the forward end thereof in a horizontal plane near to the surface of the ground, while its rear end is in the plane of the disc at the forward edge thereof. This gathering device is preferably formed of a sheet metal member M fashioned to have its inner edge substantially in alignment with the line of intersection of the disc with the earth, so that any vines extending laterally beyond this line will be above said member. From its forward edge the member M curves upward and inward into the plane of the disc to a point adjacent to an arc of its forward edge and is then abruptly offset laterally outward at M' and has a shank portion $M^2$ parallel to but spaced from the disc. Such spacing provides sufficient clearance for any lateral movement of the disc against the yielding pressure of the spring $J^2$, there being also like clearance between the disc and the portion $F^2$ of the arm F.

Receptacle for the severed vines

In rear of the discs I have provided a basket like receptacle N with its lower portion just above the ground level. This receptacle is formed of a series of curved tines N' having their upper ends clamped to a cross bar $N^2$ and extended forward of said cross bar to eyes $N^3$. A shaft O passes through these eyes and is secured to the frame member D by bearings O' at opposite ends thereof. A curved bar $N^4$ is clamped to the tines by members $N^5$ to hold said tines in proper spaced relation to each other. The bar $N^2$ has depending therefrom a curved arm $N^6$ which is pivotally connected to a rod $N^7$ extending forward to a convenient position for actuation by the operator to periodically dump the cumulative vines from the basket.

With the construction as described to adjust the machine for use, the sub-frames E are first adjusted on the main frame D so that the pairs of discs will be spaced from each other to correspond to the distance between rows of plants. The machine is then advanced by means of a tractor or other suitable propulsion means which will cause the discs to rotate with segments thereof cutting into the earth on opposite sides of each row of plants. As these discs have sharp edges which are in tangent relation to each other, they will successively cut through the stocks of the vines below the ground level severing the same from the roots. The gathering means M will lift the vines from the ground to direct them into the V-shaped area between discs and the latter will assist in feeding the vines rearward into the basket N. When a suitable quantity of vines has been deposited in the basket, the latter may be dumped into a pile by the operation of the rod $N^7$. Also, any loose pods will be gathered with the vines and deposited in the pile.

What I claim as my invention is:

A harvester for beans and the like, comprising a supporting frame, a pair of revoluble discs having sharp peripheral edges mounted on said frame in oblique planes to converge from opposite sides of a row of plants into tangent relation to each other at a point beneath the surface of the ground and forming a trough therebetween above the ground, whereby in the advancement of said frame along the row the roots of the plants will be severed from the vines, gathering means for the vines in advance of each disc being also mounted on said frame to have its rear portion in the plane of and adjacent to the periphery of said disc, and its forward portion substantially parallel to the ground surface and slightly above the same whereby the vines and their pods will be passed between said discs and severed from the roots beneath the ground.

FREDERICK B. FITCH.

REFERENCES CITED

The following references are of record in the file of this patent:

UNITED STATES PATENTS

| Number | Name | Date |
| --- | --- | --- |
| 24,482 | Newman | June 21, 1859 |
| 439,344 | Clement | Oct. 28, 1890 |
| 875,275 | Lewis | Dec. 31, 1907 |
| 922,084 | Carroll | May 18, 1909 |
| 1,174,762 | Quance | Mar. 7, 1916 |
| 1,264,385 | Grojean | Apr. 30, 1918 |
| 1,537,618 | Proper | May 12, 1925 |
| 1,675,903 | Murphy | July 3, 1928 |
| 1,727,802 | Aven | Sept. 10, 1929 |
| 1,928,868 | Poen | Oct. 3, 1933 |
| 1,938,347 | Munger | Dec. 5, 1933 |